United States Patent
Evans

(10) Patent No.: US 6,853,627 B1
(45) Date of Patent: Feb. 8, 2005

(54) METHOD, SYSTEM AND RADIO BASE STATION FOR PAGING A MOBILE STATION IN A THIRD GENERATION GENERAL PACKET RADIO SERVICE (GPRS) NETWORK

(75) Inventor: Paul Evans, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/552,766

(22) Filed: Apr. 19, 2000

(51) Int. Cl.[7] .............................. H04J 3/24; H04Q 7/00
(52) U.S. Cl. ........................ 370/312; 370/313; 370/345
(58) Field of Search ............................... 370/312, 313, 370/328, 338, 342, 345, 352, 311

(56) References Cited

FOREIGN PATENT DOCUMENTS

| WO | WO 97/09837 | 3/1997 |
|---|---|---|
| WO | WO 99/49626 | 9/1999 |
| WO | WO 00/69188 | 11/2000 |

OTHER PUBLICATIONS

A. Campbell, et al., "An Overview of Cellular IP", XP002902055, IEEE Wireless Communications and Networking Conference, Sep. 21–24, 1999, pp. 606–610.

A. Campbell, et al., "A Cellular IP Testbed Demonstrator", XP002902056, IEEE Mobile Multimedia Communication, Nov. 15–17, 1999, pp. 145–148.

R. Ramjee, et al., "Paging Support for IP Mobility Using HAWAII", XP002902057, Internet Engineering Task Force, Internet Draft, <draft–ietf–mobileip–paging–hawii–00.txt>, dated Jun. 25, 1999.

International Search Report, PCT/SE01/00851, dated Dec. 7, 2001.

*Primary Examiner*—John Pezzlo
*Assistant Examiner*—Saba Tsegaye
(74) *Attorney, Agent, or Firm*—Alex Nicolaescu, Ericsson Canada, Inc.

(57) ABSTRACT

In a third generation (3G) General Packet Radio Service (GPRS) network, a method, system and Radio Base Station (RBS) for paging a Mobile Station (MS) wherein a portion of the master routing area-cell mapping table related to a particular Radio base Stations (RBS) is downloaded in that RBS. The serving GPRS Support Node (SGSN) initiates a page request and sends it through an IP based network directly to the RBSs, without involving a Radio Network Server (RNS) or a Radio Network Management Control Point (RMCP), via broadcast message, such as for example an IP broadcast message or an IP Multicast Message. Upon receipt of the page request, each RBS decapsulates the received message, extracts the routing area (RA) information, derives the cell list to be paged from the RBS resident routing area-cell mapping table and performs the actual radio page broadcast over the destination cells.

12 Claims, 4 Drawing Sheets

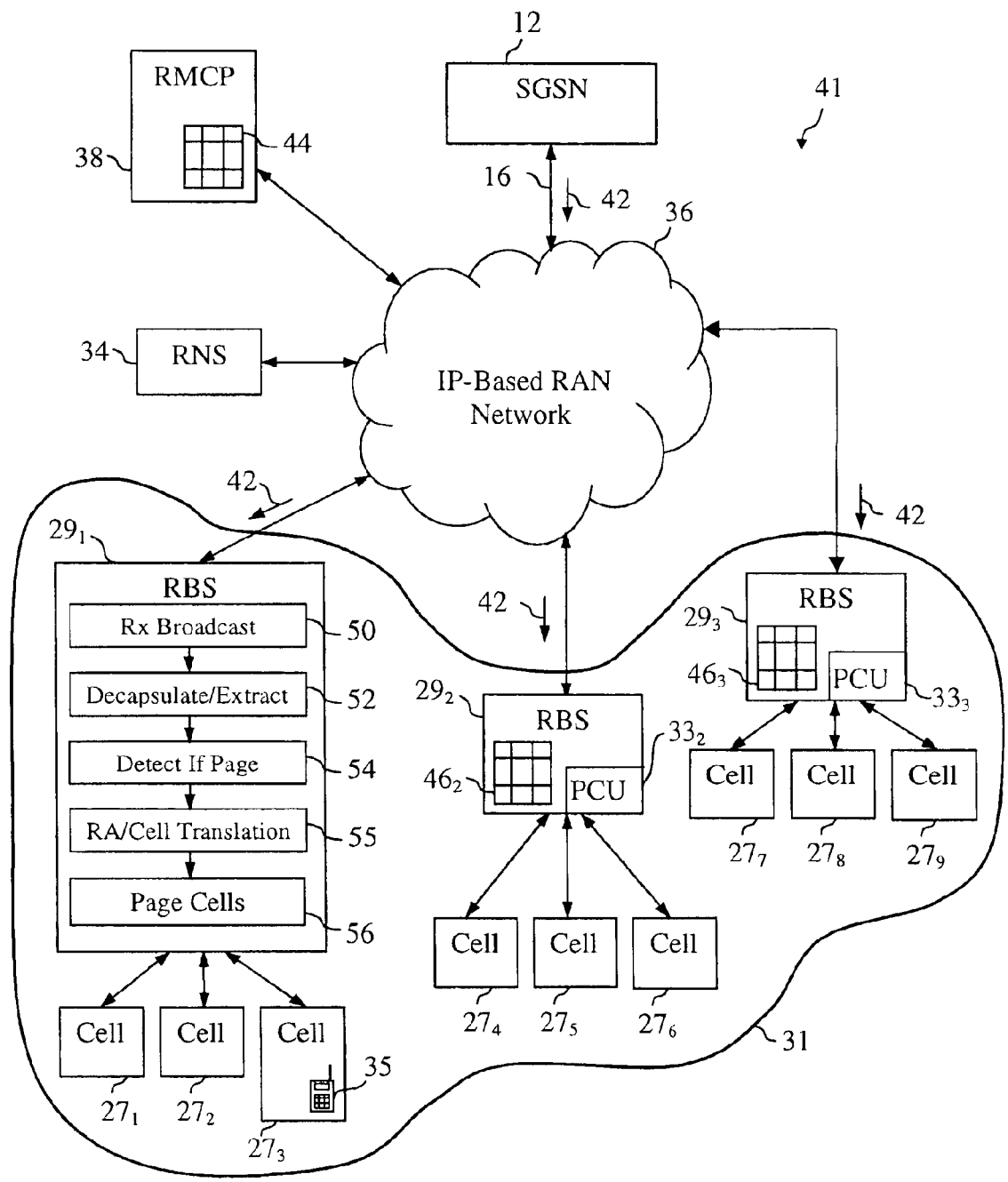
Figure 3.a

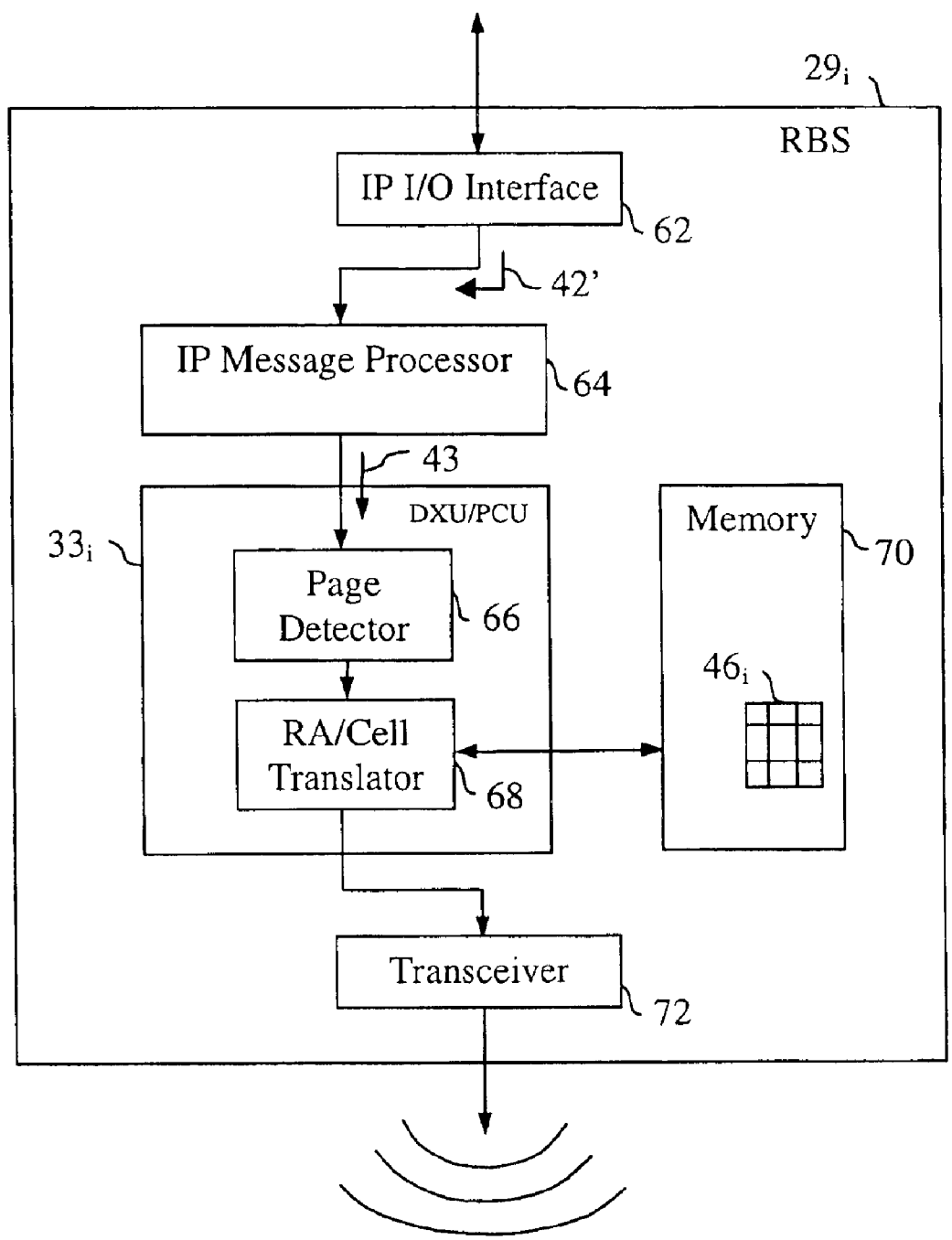
Figure 3.b

METHOD, SYSTEM AND RADIO BASE STATION FOR PAGING A MOBILE STATION IN A THIRD GENERATION GENERAL PACKET RADIO SERVICE (GPRS) NETWORK

BACKGROUND OF THE INVENTION

1. Field of the Invention

The present invention relates to method and system for paging for a Mobile Station (MS) in a General Packet Radio Service (GPRS) wherein the Base Stations (BSs) comprise a portion of the routing area-cell mapping information.

2. Description of the Related Art

Wireless communications have changed over the last decade, evolving from the first generation of analog cellular service, to the second generation of digital cellular service. Among other advantages, digital cellular service allows subscribers to receive enhanced voice and data communications, while increasing the number of channels available in a given area. However, as the demand for wideband wireless data transmission becomes more and more significant, and since cellular operators foresee a great business opportunity in fulfilling the subscribers' request for the wireless wide-band transmissions, a third generation of cellular networks is under way of being achieved and implemented. The third generation of cellular networks allows wide-band voice and data transmission at rates of up to 2 Mega-bits per second, and make use of improved existing technology. For example, the Wide-band Code Division Multiple Access (W-CDMA), the Enhanced Data rates for Global Evolution (EDGE), and the General Packet Radio Service (GPRS) are all third-generation technologies that may provide high-speed connection of a Mobile Station (MS) in a pure third-generation cellular network, or in a network comprising both third-generation systems combined with legacy systems (second generation and first generation systems).

In particular, GPRS is a packet-based wireless communication service that can provide transmission data rates from 56 up to 114 Kbps and continuous connection to the Internet for MSs and computer users. The higher data rates will allow users to take part in video conferences and interact with multimedia Web sites and similar applications using mobile handheld devices as well as notebook computers. GPRS is based on Global System for Mobile (GSM) communications and will complement existing services provided by the legacy systems. In theory, GPRS packet-based service should cost users less than circuit-switched services since communication channels are being used on a shared-use, as-packets-are-needed basis rather than dedicated only to one user at a time. It should also be easier to make applications available to mobile users because the faster data rate means that middleware currently needed to adapt applications to the slower speed of wireless systems will no longer be needed. Once GPRS becomes available, mobile users of a virtual private network (VPN) will be able to access the private network continuously rather than through a dial-up connection.

A typical GPRS network comprises a Gateway GPRS Support Node (GGSN) which acts as an interface between the packet core network and the public IP network, a Serving GPRS Support Node (SGSN) which is the GPRS network's switching node, a GPRS Home Location register (HLR) holding the subscribers' data, a plurality of Base Station Controllers (BSCs), each managing one or more Radio Base Stations (RBSs) which are responsible for the actual radio communications with the MSs. Cellular operators' requirement for flexible open systems is driving the implementation of Internet Protocol (IP) based networks. Such an IP connection may be implemented between the SGSN and the BSCs and further between the BSCs and the RBSs.

Current GPRS systems combined with and deployed in GSM networks make use of the BSCs to initiate paging on the Packet Data Control Channel (PDCH), which is the channel type used in GPRS between the BSCs and the RBSs. Communications between the SGSNs and the Radio Access Network (RAN) are governed in a GPRS network by the Base Station Subsystem GPRS Protocol (BSSGP), herein enclosed by reference. A Packet Control Unit (PCU) located in each BSC is responsible for interpreting the BSSGP page messages received from the SGSN, and for passing the page requests to the BSC application software, which in turn initiates the actual page on the PDCHs associated with the routing area (RA) designated in the BSSGP page message received from the SGSN.

However, in the situation described hereinbefore, wherein a page for a particular MS is initiated by the network, it has been noticed that the time required for a page to be transmitted on the air interface may be significantly increased in a $3^{rd}$ generation IP-based radio access network. This is due to the non-dedicated nature of the IP-based transmission that require longer time for packet data signaling than in the legacy systems wherein control channels were allocated a particular physical communication link.

In particular, in a GPRS network, the Radio Network Server (RNS) typically communicates directly with the SGSN and handles all real-time activities of the RAN, which may comprise the set of BSCs and RBSs. Such real-time activities comprise the page processing using routing area-cell mapping information, i.e. the real-time interpretation and conversion of each page destination address into cell page signals to be transmitted to the controlling RBS from the RNS, seizure of traffic channels and updating of radio parameters in the RBS. The Radio Network Management Control Point (RMCP) is the GPRS network node dedicated to the non-real-time activities related to the RAN, such as the storing of the routing area-cell mapping information and cells configuration in an information database, which regularly updates RNS with parameters related to real-time page processing. However, it has been noticed that in the IP-based GPRS RAN configuration wherein the SGSN acquires knowledge of the RA from the network management system, the time for the page to reach the intended MS is increased when compared with second generation (2G) radio access networks. This is because the page sent from the SGSN and containing RA information must pass via the RNS, which is located in the radio access network, then sent on a non-dedicated channel toward the RBSs for finally being radio broadcast.

In order to support higher data rates and real-time applications the European Telecommunications Standards Institute (ETSI) GPRS are currently being modified to cover the introduction of EDGE-based GPRS technology for the GSM and ANSI-41 markets. For supporting such higher data rates, GPRS designers may propose to include the Radio Link Control/Medium Access Control (RLC/MAC) functionality of the PCU in closer physical proximity to the Channel Codec Unit (CCU). This is believed to eliminate delays which would be introduced when communications between these two physical/functional entities are performed over an IP-based RAN. Voice-over-IP implementation is particularly sensitive to this delay. However, such a change will have impacts on currently used scheme for handling the routing area-cell mapping processing for each page, and there is currently no solution for this matter.

It would be advantageous to have a more straightforward way for sending a page request from the SGSN to the RBSs than in the scenario described hereinbefore. It would be even more advantageous to have a page request being send without the need to pass through a BSC, wherein the routing area-cell-mapping processing would be delegated to each RBS receiving the page, so that the intermediate processing of the page request is avoided.

The present invention describes such a solution.

SUMMARY OF THE INVENTION

It is therefore an object of the present invention to provide a Radio Base Station (RBS) that comprises a portion of the master routing area-cell mapping table, relevant for that particular RBS, so that the page processing is distributed to each RBS of the GPRS telecommunications network.

It is another object of the present invention to provide a method for paging for a Mobile Station (MS) in a GPRS telecommunications network, wherein a particular RBS receives a page request, derives the routing area information from the page request and translates it into cell destination information that is further used for paging for the MS.

In accord with the objects of the invention, there is provided in a GPRS cellular telecommunications network, a Radio Base Station (RBS) comprising:

routing area-cell mapping information defining a relation between a routing area (RA) and at least one cell of said RBS; and a Packet Control Unit (PCU) for processing a page request received from a Serving GPRS Support Node (SGSN);

wherein said PCU associates a RA information extracted from said page request with cell identification information using said routing area-cell mapping information.

In accordance with the objects of the present invention, there is further provided a packet-switched GPRS cellular telecommunications network comprising:

a Serving GPRS Support Node (SGSN);

an IP-based Radio Access Network (RAN); and at least one Radio Base Station (RBS) comprising routing area-cell mapping information;

wherein said routing area-cell mapping information defines a relation between a Routing Area (RA) and at least one cell served by said RBS.

There is yet another object of the invention to provide a method for paging for a Mobile Station (MS) at least one cell of a Radio Base Station (RBS), said method comprising the steps of:

receiving by said RBS a broadcast message comprising a Base Station Subsystem GPRS Protocol (BSSGP) page request;

extracting from said broadcast message said BSSGP page request comprising a routing area (RA) information;

translating said RA information into cell identity information based on a RA-cell mapping information stored in said RBS; and paging at least one cell served by said RBS based on said cell identity information.

There is yet another object of the present invention to provide in a GPRS cellular telecommunications network a method for paging for a Mobile Station (MS) at least one cell of a Radio Base Station (RBS), said method comprising the steps of:

receiving by said RBS an IP multicast message;

decapsulating said IP multicast message in the RBS;

extracting from said IP multicast message a Base Station Subsystem GPRS Protocol (BSSGP) message in the RBS;

detecting in the RBS if said BSSGP message is a page request message;

if said BSSGP message is a BSSGP page request, translating said RA information into cell identity information based on an RA-cell mapping information stored in said RBS; and paging at least one cell served by said RBS based on said cell identity information.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 3.$a$ is a top level block diagram of a 3G GPRS network according to an exemplary preferred embodiment of the present invention; and FIG. 3.$b$ is a top level functional block diagram of a 3G GPRS Radio Base Station according to an exemplary preferred embodiment of the present invention.

DETAILED DESCRIPTION OF THE PREFERRED EMBODIMENTS

Figure 1:
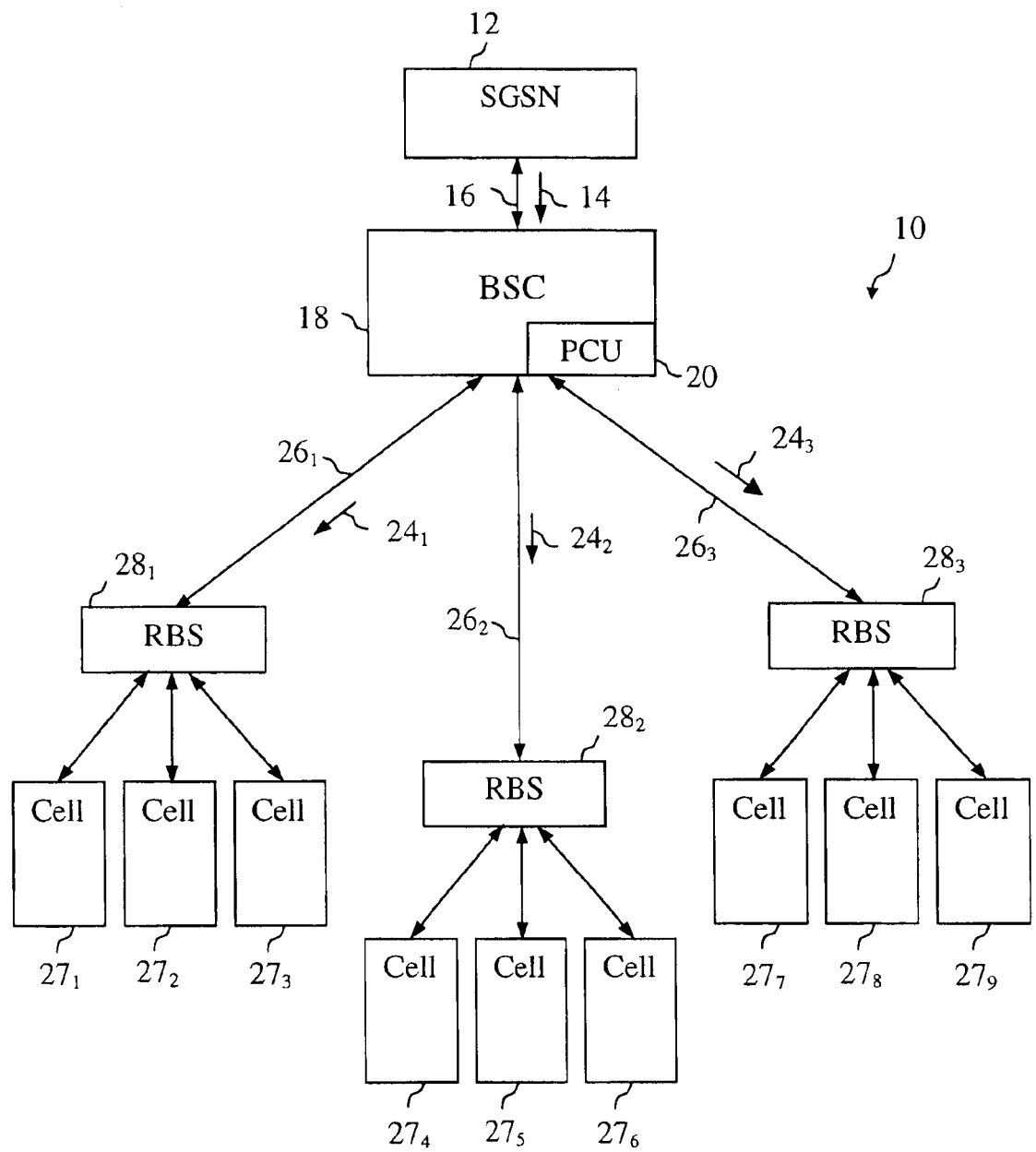
FIG. 1 is a top level block diagram of a 2G GPRS network according to the typical prior art implementation.

Reference is now made to FIG. 1, wherein there is shown a high-level block diagram of a known prior art 2G (second generation) GPRS network 10. In a typical page scenario, the SGSN 12 initiates a page using the well known BSSGP protocol, herein enclosed by reference, by sending a BSSGP page request 14 over a Frame Relay (FR) dedicated link 16 to the BSC 18. The PCU 20 of the BSC 18 reads the BSSGP page request 14, and a list of cells related to a given Routing Area (RA) 22 is derived. Using the list of cells to whom the page is destined, the PCU 20 then sends individual page requests $24_1$ through the dedicated links 26, connecting the BSC 18 and the RBSs 281. Thereafter, the RBSs $28_1$ broadcast the actual radio page message toward the MSs currently located in their respective cells $27_1$.

However, the mentioned scenario comprises a number of drawbacks: first, in the 2G GPRS network 10 shown in FIG. 1, all the illustrated links $26_1$ are dedicated, and this is in course of being replaced by more practical and economical non-dedicated IP-connections. Furthermore, it is believed that the use of IP-based radio access networks, coupled with the development of standard protocols over IP will allow operators to source equipment from many vendors and encourage new equipment vendors in the market, thereby increasing market competition.

Figure 2:
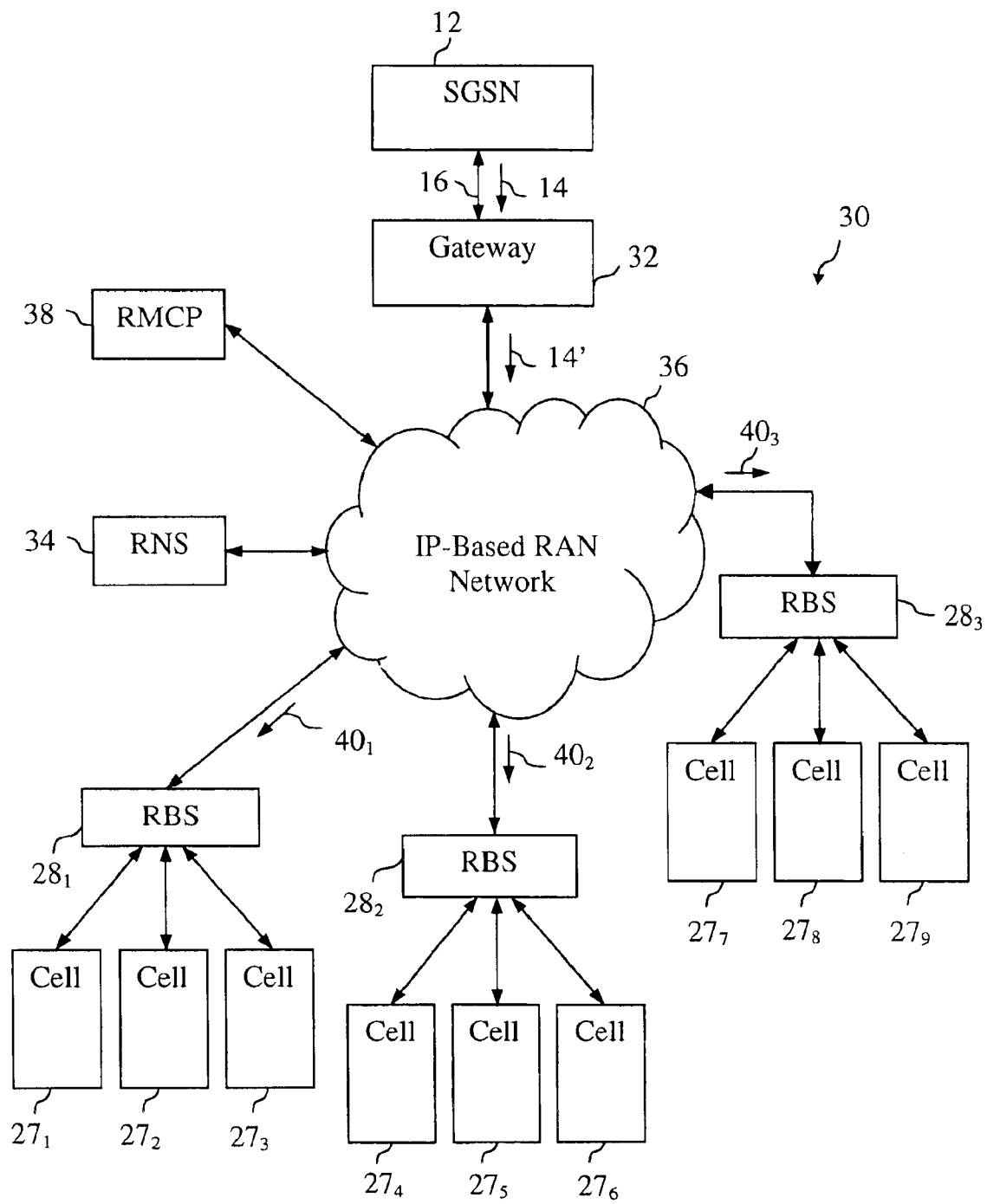
FIG. 2 is a top level block diagram of 3G GPRS network according to the typical prior art implementation.

Reference is now made to FIG. 2, which illustrates a high level block diagram of a proposed 3G (third generation) GPRS network 30, which is known in the prior art.

In a typical page scenario, the SGSN 12 initiates a page using the well known BSSGP protocol by sending a BSSGP page request 14 over an FR dedicated link 16 to an IP Gateway node 32. Thereafter, the IP Gateway 32 sends a BSSGP page request over IP 14' to the RNS 34 through an IP based RAN 36. Upon receipt of the page request 14', the RNS 34 interprets the BSSGP page request over IP 14' using routing area-cell mapping information obtained from the RMCP 38, and determines the destination RBSs and cells that must be paged. Through the same IP RAN 36, the RNS sends a BSSGP page over IP $40_1$ to the destination RBSs $28_1$ (assuming that cells served by the three RBSs must be paged) which further interpret the page and then broadcast the actual radio page message over the corresponding cells $27_1$.

This proposed prior art scenario still comprises several limitations. First, keeping the page processing intelligence in the RNS 34 creates an unnecessary intermediate step in the transmission of the page request from the SGSN 12 to the RBSs $28_1$. Furthermore, the RNS must handle all pages for the IP-based RAN 36. This may overload the finite processing capacity of the RNS node 34.

Reference is now made to FIG. 3.a wherein there is shown a high level block diagram of an exemplary preferred embodiment of the present invention related to an improved paging scenario in a 3G (third generation) GPRS network 41. First the SGSN 12 connected to the IP based RAN network 36 (although an IP gateway 32 may exist between the SGSN 12 and the IP based RAN network 36) initiates a BSSGP page message encapsulated in a broadcast message 42 such as for example in an IP multicast message, an IP broadcast message, a network directed broadcast message, or any other type of broadcast message that would be suitable in a particular implementation within a particular GPRS network. However, according to a particular embodiment of the invention, the broadcast message is preferably an IP multicast message, and the invention is therefore described with reference to an IP multicast message being used for carrying the BSSGP page request, although the invention is not limited to this particular implementation. Thus, the broadcast message 42 may be an IP multicast message sent over the IP-based RAN 36 and directed to a particular routing area 31. Various routers within the IP-based RAN 36 (routers not shown) direct the IP multicast message in such a manner that it reaches all RBSs $29_1$ connected to the RAN 36 and that are part the RA 31 to which the page is addressed. The routing is performed by the IP routers based on the IP header of the IP multicast message that contains a destination multicast address corresponding to the RA 31, as defined by the network operator, in a manner that is known by those skilled in the art, and typically according to the two main standards that governs the use of IP multicast, first, the Request for Comments (RFC) 1112—Host Extensions for IP Multicasting, and, second, RFC 1584—Multicast Extensions to Open Shortest Path First (OSPF).

When an RBS joins a multicast group, a request may be sent to and processed by all native multicast routers of the IP-based RAN 36 logically located between the host and the destination (if no IP tunneling is used). Therefore, when the SGSN 12 later sends an IP multicast message 42 comprising a BSSGP page, the multicast routers (not shown) between the SGSN 12 and the relevant RBSs $29_1$ are aware that there is a host (the RBS $29_1$) on its outgoing side for which this message is relevant, and therefore let the IP multicast pass and continue its route toward the RBS. The IP multicast message is sent between the multicast routers (not shown) of the IP-based RAN 36 until reaching the LAN router which fully maps the multicast address to its associated host hardware address. The receiving host's (RBS's) network card and network driver, such as the RBS's IP Interface 62 shown in FIG. 3.b, listens for this address and passes the incoming multicast messages to the TCP/IP protocol stack, such as for example to the IP message processor 64 shown in FIG. 3.

With reference again to FIG. 3.a, according to a preferred embodiment of the invention, the RMCP 38 that holds the master routing area-cell mapping table 44 (defining the relations between the routing areas of the GPRS network 41 and the cells corresponding to the RBSs $29_1$) also downloads through the IP-based RAN 36, in each RBS $29_1$, a sub-set of the routing area-cell mapping table 44 directed to that particular RBS $29_1$. For example, the RBS $29_2$ will store its own sub-set RA-cell mapping table $46_2$ of the master table 44, which defines, for example, the relation between the RA 31 and its cells $27_4$, $27_5$, and $27_6$ (the RA-cell mapping table $46_1$ of RBS $29_1$ is not shown although it is understood that each RBS $29_1$ comprises, according to the invention, its own RA-cell table $46_1$). Furthermore, each RBS $29_1$ comprises a Packet Control Unit (PCU) functionality 33 that is in charge of interpreting the signaling received and sent to and from the RBS $29_1$.

Reference is now made to the RBS $29_1$ of FIG. 3a wherein there is shown an exemplary flowchart diagram illustrating how a page message is processed within each RBS $29_1$ according to the preferred embodiment of the invention (although only represented for RBS $29_1$). First, the broadcast message 42 is received at the RBS $29_1$ through the RAN 36, action 50. Then the broadcast message 42 is decapsulated and the BSSGP page message is extracted, action 52. Those skilled in the art would readily notice that action 52 may slightly vary depending upon the actual form of the broadcast message. For example, in the case wherein the broadcast message 42 is an IP broadcast message, the treatment may be different than if the broadcast message 42 is an IP multicast message. Besides, the action 52 alone is performed in a manner known by those skilled in the art. Once the BSSGP page message is extracted from the broadcast message 42, the RBS $29_1$ detects if the extracted BSSGP message is indeed a page message, action 54. This action is necessary since other messages than a page message may also be transmitted to an RBS in a broadcast message. Assuming that the BSSGP message is actually a page message as detected in action 54, it is also concluded (action not shown) that the received page message is actually directed to the RBS $29_1$. This conclusion is possible since the routing of the broadcast message 42 in the RAN 36, based on the broadcast message destination address (such as the IP multicast address in case of the IP multicast message) is done in such a manner that each RBS only receives messages that are relevant for that particular RBS. However, alternatively, if the configuration of the RAN 36 is so arranged that one RBS may receive messages that are not relevant, then the RBS may perform an additional action in order to detect if the page is relevant.

Based on information extracted from the BSSGP page message, the RBS $29_1$ then translates the routing area to be paged (RA 31) into cells Ids by consulting the correspondence table $46_1$, action 55. As also mentioned hereinbefore, the table $46_1$ of the RBS $29_1$ comprises the correspondence information between the RA 31 and the cells served by that particular RBS. As a result of the translation 55, the RBS $29_1$ knows which cells must be paged for a particular mobile station (MS) 35 according to the received BSSGP page message. Finally, the RBS $29_1$ carries out the actual radio paging for the MS 35 over the required cell, such as for example over the cell $27_3$, action 56.

According to the preferred embodiment of the invention, the IP-based RAN 36 is configured to support IP multicast messaging. Therefore, an IP multicast functionality may be used for transmitting the page request from the SGSN 12 to the right RBS by associating an RA 31 to an IP multicast address. The processing within the RBSs is similar to what has been described hereinbefore, but it is believed that by using an IP multicast message for paging, less resources are necessitated for message processing within the RBSs than if an IP broadcast message is employed. This is due to the fact that an IP multicast message is typically processed differently in the RBSs than a regular IP broadcast message, in the sense that for a received IP multicast message the lower network layers of the RBS, such as the datalink ($2^{nd}$) layer of the RBS, can take charge of the message processing without involving the application ($3^{rd}$) network layer in that processing.

Reference is now made to FIG. 3.*b*, wherein there is shown an exemplary high-level functional block diagram of a possible implementation of the invention within the RBS 29$_1$.

When a broadcast message 42, such as an IP multicast message 42' comprising a BSSGP page request 43, arrives at the RBS 29$_1$, first it is received in an IP I/O interface 62 that recognize that the IP multicast message is relevant for the particular RBS. In some implementations, the presence of module 62 is however optional. It is also to be understood that although the invention is herein described with respect to an IP multicast message carrying the BSSGP page request 43 to the RBS 29$_1$, other types of broadcast messages, such as for example an IP broadcast message, may be used as well for paging according to the invention. Then, the IP multicast message 42' is sent into an IP Message Processor 64 which decapsulates the IP multicast message 42' and extracts the BSSGP page request 43. Afterwards, the BSSGP page request 43 is transmitted in a Page Detector Module 66 for detecting if it is actually a page request, or not. In the affirmative, i.e. if it is detected by the Page Detector 66 that the BSSGP message is a page request, the BSSGP page request 43 is further sent to a RA/Cell Translator 68 for transforming the RA information contained in the BSSGP page request in Ids of the cells that are to be paged. For that purpose, the RBS 29$i$ comprises a Memory 70, such as a database, a cache, a RAM or other suitable means, for storing its own sub-set of the RA-cell table 46$_1$. The RA/Cell Translator 68 requests and obtains from the Memory 70 a copy of the RA/Cell mapping table 46$_1$, and based on this correspondence information translates the RA information into IDs of the RBS' cells to be paged. Once the identity of the cells to be paged are obtained by the Translator 68, the Transceiver 72 performs the actual radio paging over those cells.

In a variant of the invention's implementation within the RBS 29$_i$, the Page Detector 66 and/or the RA/Cell Translator 68 may be comprised in the Data Exchange Unit (DXU) or in the same Packet Control Unit (PCU) 33, of the RBS 29$_i$. Furthermore, anyone of the IP Message Processor 64, the Page Detector 66 and the RA/Cell Translator 68 and may be either distinct or joined, software or hardware modules. According to the preferred embodiment of the invention, the IP Message Processor 64, the Page Detector 66 and the RA/Cell Translator 68 are functional software modules running on the same software operating system and hardware platform within the RBS 29$_i$.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telecommunications network, a Radio Base Station (RBS) comprising:

routing area-cell mapping information defining a relation between a routing area (RA) and at least one cell of said RBS; and a Packet Control Unit (PCU) for processing a page request received from a Serving GPRS Support Node (SGSN);

wherein said PCU associates an RA information extracted from said page request with cell identification information using said routing area-cell mapping information, said routing area-cell mapping information of said RBS being downloaded from at least one of a Radio Network Management Control Point (RMCP) and a Radio Network Server (RNS) of said cellular telecommunications network.

2. The RBS as claimed in claim 1, wherein said page request is comprised in a broadcast message sent from said SGSN.

3. The RBS as claimed in claim 2, wherein said broadcast message is an IP broadcast message.

4. The RBS as claimed in claim 2, wherein said broadcast message is an IP multicast message.

5. The RBS as claimed in claim 4, wherein said RBS further comprises an IP message processor for decapsulating said IP multicast message and for extracting a Base Station Subsystem GPRS Protocol (BSSGP) message from said IP multicast message; and wherein said PCU further comprises:

a Page Detector for detecting it said BSSGP message is a BSSGP page request, said Page detector receiving said BSSGP page message from said IP Message Processor; and a routing area/Cell mapping translator for translating said routing area information extracted from said BSSGP page request in said cell identification information, said Translator receiving said BSSGP page request.

6. The RBS as claimed in claim 5, further comprising:

a memory for storing said routing area-cell mapping information, wherein said translator is linked to said memory, and obtains from said memory said routing area-cell mapping information for translating said routing area information in cell identification information.

7. A packet-switched GPRS cellular telecommunications network comprising:

a Serving GPRS Support Node (SGSN);

an IP-based Radio Access Network (RAN);

at least one Radio Base Station (RBS) comprising routing area-cell mapping information;

a Radio Network Management Control Point (RMCP) node for storing a master routing area-cell mapping table defining relations between a plurality of routing areas (RAs) and a plurality of cells of said network;

wherein said routing area-cell mapping information defines a relation between an RA and at least one cell served by said RBS, wherein said routing area cell-mapping information of said RBS comprises a sub-set of said master routing area-cell mapping table, and is obtained from said RMCP by downloading in said RBS a portion of said master routing area-cell mapping table that relates to at least one cell served by said RBS.

8. The GPRS cellular telecommunications network as claimed in claim 7, wherein said RBS further comprises:
   a memory for storing said routing area-cell mapping information; and
   a routing area/cell mapping translator for translating a RA information extracted from a received page request message in cell identification information.

9. In a GPRS cellular telecommunications network, a method for paging for a Mobile Station (MS) in at least one cell served by a Radio Base Station (RBS), said method comprising the steps of:
   receiving by said RBS a broadcast message comprising a Base Station Subsystem GPRS Protocol (BSSGP) page request;
   extracting from said broadcast message said BSSGP page request comprising a routing area (RA) information;
   translating said RA information into cell identity information based on a RA-cell mapping information stored in said RBS; and
   paging in at least one cell served by said RBS based on said cell identity information;
   wherein said RA-cell mapping information of said RBS is downloaded from at least one of a Radio Network Management Control Point (RMCP) and a Radio Network Server (RNS) of said GPRS cellular telecommunications network.

10. The method as claimed in claim 9, wherein said broadcast message is an IP broadcast message.

11. The method as claimed in claim 9, wherein said broadcast message is an IP Multicast message.

12. The method as claimed in claim 11, wherein the step of extracting comprises the step of decapsulating said IP multicast message.

* * * * *

UNITED STATES PATENT AND TRADEMARK OFFICE
CERTIFICATE OF CORRECTION

PATENT NO. : 6,853,627 B1  
APPLICATION NO. : 09/552766  
DATED : February 8, 2005  
INVENTOR(S) : Evans It is certified that error appears in the above-identified patent and that said Letters Patent is hereby corrected as shown below:

In Fig 3.b, Sheet 4 of 4, delete Tag "$29_i$," and insert Tag -- $29_1$ --, therefor.

In Fig 3.b, Sheet 4 of 4, delete Tag "$33_i$," and insert Tag -- $33_1$ --, therefor.

In Fig 3.b, Sheet 4 of 4, delete Tag "$46_i$," and insert Tag -- $46_1$ --, therefor.

Column 4, Line 48, delete "26," and insert -- $26_1$ --, therefor.

Column 4, Line 49, delete "281" and insert -- $28_1$ --, therefor.

Column 7, Line 43, delete "$29_i$," and insert -- $29_1$ --, therefor.

Column 7, Line 54, delete "$29_i$," and insert -- $29_1$ --, therefor.

Column 7, Line 56, delete "33," and insert -- $33_1$ --, therefor.

Column 7, Line 56, delete "$29_i$," and insert -- $29_1$ --, therefor.

Column 7, Line 64, delete "$29_i$," and insert -- $29_1$ --, therefor.

Column 8, Line 37, in Claim 5, delete "it" and insert -- if --, therefor.

Signed and Sealed this

Fifteenth Day of April, 2008

JON W. DUDAS  
*Director of the United States Patent and Trademark Office*